Feb. 20, 1945. G. A. MEAD 2,369,837
CURRENT COLLECTOR
Filed Oct. 9, 1943 2 Sheets-Sheet 1

Inventor
George A. Mead

Feb. 20, 1945. G. A. MEAD 2,369,837
CURRENT COLLECTOR
Filed Oct. 9, 1943 2 Sheets-Sheet 2
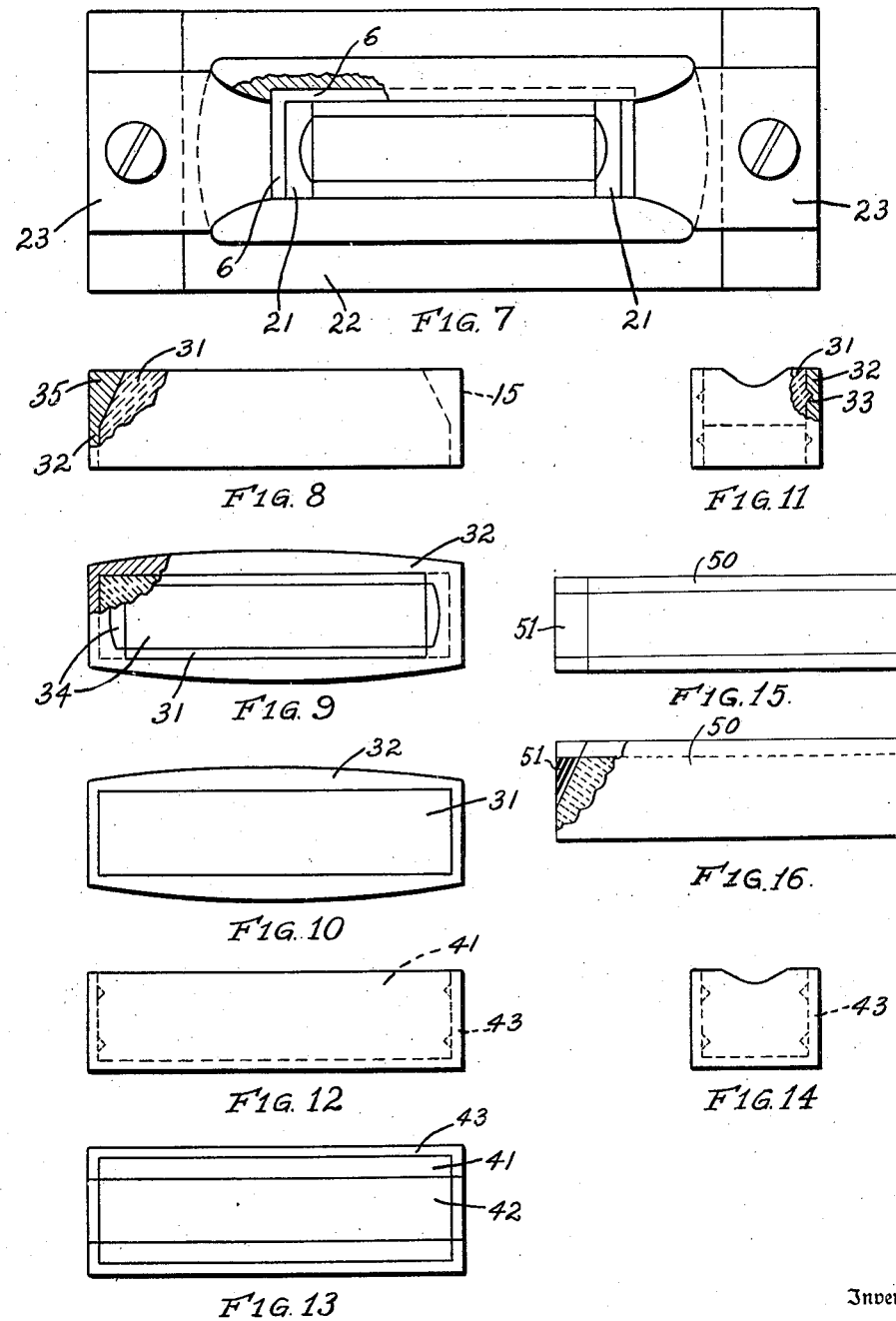
Inventor
George A. Mead Patented Feb. 20, 1945

2,369,837

UNITED STATES PATENT OFFICE 2,369,837

CURRENT COLLECTOR

George A. Mead, Mansfield, Ohio, assignor to The Ohio Brass Company, Mansfield, Ohio, a corporation of New Jersey Application October 9, 1943, Serial No. 505,705

10 Claims. (Cl. 191—59.1)

My invention relates to current collectors for use on electrically operated vehicles for gathering current from a trolley conductor and has more specific reference to grooved collectors of the sliding type in which an insert of carbon or other electricity conducting material is used.

One object of my invention is to provide a collector shoe or slide with a separately formed insert.

Another object is to provide a current collector with renewable insert.

Another object of my invention is to provide a collector with an insert of carbonaceous material.

Still another object is to provide a current collector with an insert of frangible current conducting material in which the insert is protected by a casing of metal, especially the end portions of the insert.

Another object of my invention is to provide a curent collector holder of metal with an insert of frangible current conducting material which is united to the holder by intervening dissimilar metal also protecting the ends of the insert.

Another object of my invention is to provide an insert per se having a metal casing integrally secured to a body of frangible current conducting material, protecting the sides from pressure and the ends from shock.

Another object of my invention is to provide a method of manufacturing my improved shoe and insert.

Other objects will appear from the subjoined specification and claims.

In the drawings:

Fig. 7 is a top view of the mold shown in Fig. 6.

Fig. 8 is a side view of my improved insert.

Fig. 9 is a top view of Fig. 8.

Fig. 10 is a bottom view of Fig. 8.

Fig. 11 is an end view of Fig. 8.

Figs. 12, 13 and 14 are side, top and end views respectively of a modified form of my insert.

Figs. 15 and 16 show a top view and a side view in partial section respectively of a modified form of insert.

Figure 1:
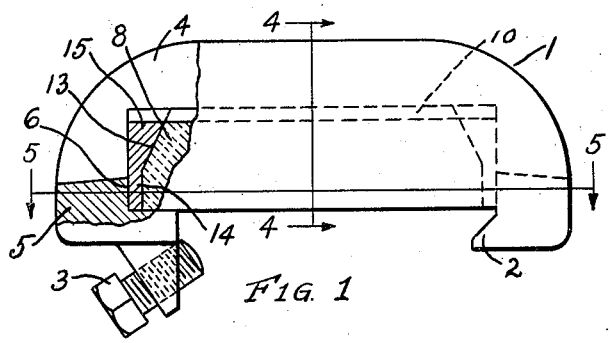
Fig. 1 is a side view in partial section of my improved shoe and insert.
Figure 4:
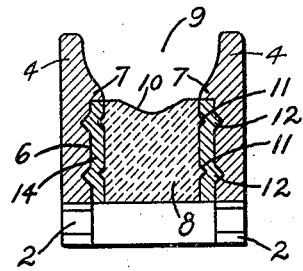
Fig. 4 is a section on the line 4—4 of Fig. 1.
Figure 2:
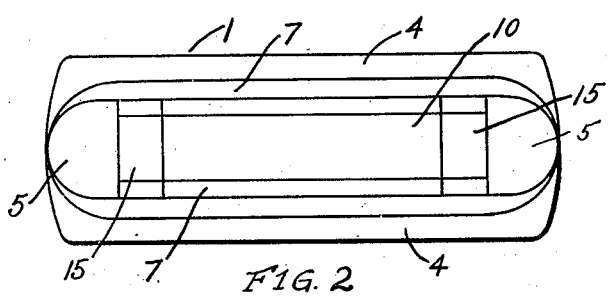
Fig. 2 is a top view of Fig. 1.
Figure 3:
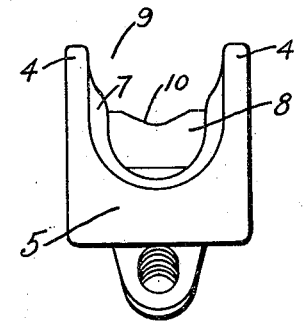
Fig. 3 is an end view of Fig. 2.
Figure 5:
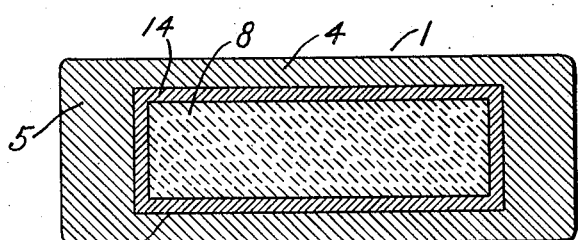
Fig. 5 is a section on the line 5—5 of Fig. 1.
Figure 6:
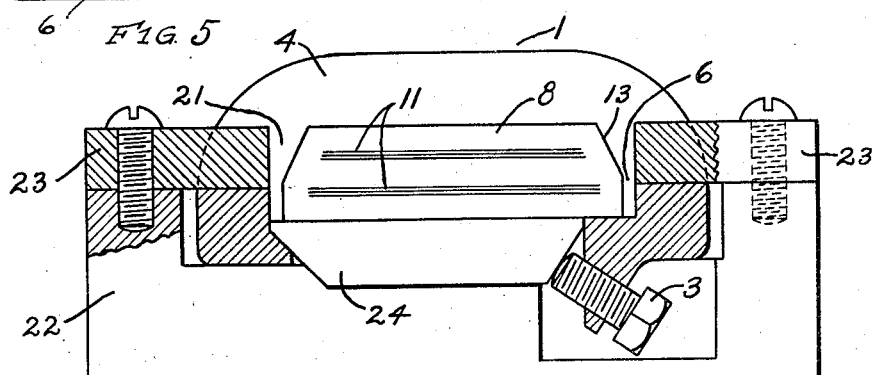
Fig. 6 is a side view in partial section of a mold for securing the frangible insert within the metal holder.

The desire on the part of operators of electric transportation systems using overhead trolley wire to conserve the same and increase the life, has led to the improved form of current collector in which an insert of carbon or other non-metallic conducting material is used in place of the previous hard metal inserts.

This form of current collector has been in successful operation for some time and has proved its practicability and efficiency.

The use of the carbon insert has made it necessary to reform many of the overhead devices such as trolley frogs, crossings, etc., in order to reduce the wear and tear upon the frangible insert.

There are, however, some systems in which the overhead has not been revamped to improve the operation of the current collector and therefore my improvement is directed to so altering the current collector and the insert as to better protect the same where the older and somewhat obsolete overhead devices are still in use.

There are in commercial use, a large number of current collecting shoes as disclosed in Larsson Patent 2,185,257, and Ryan patents, 2,185,268 and 2,185,270 which are giving entire satisfaction except in the cases cited above and my improvements are in connection with these particular collectors but may relate to other forms of collectors.

The difficulty found with the present current collectors and carbon insert when used with old style trolley devices, is the abuse to the carbon insert, especially at the ends as such ends are subject to shock and blows which they do not receive with the modern overhead as the collector rides across the improved frogs, crossings, etc., almost exclusively on the flanges of the shoe or holder.

In the preferred embodiment of my invention I use a holder 1 of metal. I do not split this holder as in the case of Patent 2,185,257 or 2,185,-268 but form a one-piece holder preferably of bronze or brass and having a hook 2 at one end and a set screw 3 at the other end by means of which the shoe is secured to a support at the upper end of a trolley pole.

The holder is formed with oppositely disposed upstanding flanges 4 and depressed end portions 5. Between the flanges and end portions is an oblong recess 6 which is shown as open on the top and bottom but may be closed on the bottom.

There are longitudinal flanges 7 overhanging the upper portion of the recess which assist together with the insert 8 in forming the groove 9.

The insert 8 is made preferably of a non-metallic current conducting material, such as carbon, graphite, etc., but may be of metal but in the latter case the material benefit derived from the use of a carbonaceous material is greatly reduced even though the metal used is one of the softer metals, such as lead, tin, aluminum, etc., or alloy thereof.

The insert is provided with a longitudinal groove 10 in the upper surface thereof for the inital centering of the trolley wire.

The insert is preferably rectangular with small projections 11 or depressions along its sides which act as anchors.

The side walls of the recess 6 are provided with depressions 12, or projections which act as anchors. The ends of the insert are beveled as at 13 and project above the end walls 5 of the holder.

Interposed between the side and end wall of the insert and the side and end walls of the holder is a filler of soft metal 14 which anchors the insert in position and interlocks with the projections or depressions 11 and 12.

The metal of the casing 14 covers the end walls of the insert above the end walls of the holder and is continuous with the metal of the side walls of the filler.

The beveled ends of the insert and the vertical end walls of the filler 14 provide considerable reinforcement 15 to the insert 8 at its ends and which receive the shocks and blows which otherwise would be taken by the ends of the insert 8.

There is a space between the insert and the walls of the recess 6 before the metal of filler 14 is applied and this space is filled with the molten metal which forms the filler 14, thus the three parts are securely anchored together when the molten metal solidifies forming a normally unitary shoe or slide.

In this construction the insert and the recess may be of other shapes than shown and the anchoring means different.

In order to prepare the unitary shoe of Fig. 1 the holder 1 is placed in a suitable cavity 21 of a mold block 22 and lugs 23 are applied as shown of proper shape and size to close the openings at the ends of the holder and the filler block 24 to close the bottom of the recess in the holder and to support the insert.

The insert 8 is then positioned in the recess 6 within the holder and molten metal poured into the space between the holder, the insert and the lugs 23.

The metal used is preferably lead or tin or other soft metal but if desired may be hardened by the addition of copper, antimony, etc.

If a unitary shoe is desired but with the ends of the insert exposed the shoe would be prepared as described with the portion 15 of the filler omitted.

It often happens that the insert will be worn through, that is in line with the upper surface of the end walls 5 and the holder still in good condition. In this case it is only necessary to apply sufficient heat to the normally unitary shoe to melt the metal of the filler 14 which will flow out, then replace the wornout insert and apply molten metal as described.

The previously used metal 14 having a lower melting point than that of the holder may be saved and re-used, thus the only expense of a renewed shoe is that of a new insert and the labor of renewal.

The groove 10 extends longitudinal of the insert 8 and of the end portions 15 and is prefer- ably formed in the insert 8 at time of manufacture in which case the groove in the portion 15 is prepared at the time of casting the metal 14 by properly shaping the lug 23.

The insert 8 and filler 14 taken together may form a separable insert for the holder disclosed in Larsson Patent 2,185,257.

At present the Larsson holder with its renewable insert formed as disclosed in Ryan Patent 2,185,270 constitutes a combination meeting with quite general use but in such combination the insert is wholly of a carbonaceous or a non-metallic conducting material and the insert is subject to the abuse set forth above where the overhead system has not been brought up to date.

Therefore I disclose, and show in Figs. 8 to 11 inclusive, an insert which will fit in the Larsson holders in use and which will have the protected ends.

In this case I prefer to use a core 31 of a rectangular shape, that is having opposite faces parallel with the end face beveled or cut back as in Fig. 1.

The cost of a rectangular core is very much less than one having the curved side faces as disclosed by Ryan.

This rectangular core 31 is placed in a mold of such shape and size as to correspond with the outer shape and dimensions of the Ryan insert and which corresponds with the recess in the Larsson holder.

With the core 31 properly placed in the mold there will be a space all around the side and end faces of the core and this space I fill with molten metal forming a metal casing 32, when solidified, of metal with an enlarged portion 35 which protects the ends of the core 31 as previously described.

The casing 32 may be anchored to the core 31 by any suitable means or the projections 33 on one of the parts. A groove 34 is formed in the upper face of the core and of the end portion of the casing and the end portion 35 is for the same purpose as the end portion 15 of Fig. 1.

The casing 32 is preferably lead or other soft metal which will wear much faster than the core or the trolley wire so as to have as little effect upon the trolley wire as possible yet protect the ends of the core from abuse.

In Figs. 12 to 14 inclusive is shown a modified form of renewable insert for use in a holder. This insert comprises a simple rectangular core preferably of carbon or other non-metallic conducting material 41 and having squared and full ends and a groove 42 and a metal case 43 of substantial thickness, say $\tfrac{1}{16}''$ or more in thickness, and which is practically of uniform thickness on the ends and side faces. The thickness of the casing at the ends may, however, be greater than on the sides and grooved according to groove 43. Also the casing metal may extend across the bottom face of the insert.

I prefer to surround the insert of Fig. 1 or the core of Figs. 9 and 13 with a substantial casing of metal which is in firm contact therewith and therefore offers support to the insert or core if of frangible material, and the enlarged portions 15 and 35 offer protection to the ends of the insert or core against breakage in use.

If the casing is of a low melting point it can be salvaged after the insert or core has served its purpose and may be used again.

In order to protect the insert 8 from injury it is only necessary to provide means at the ends of the members 8 and 31 with a soft metal nose sufficiently thick or heavy for the purpose. Also protection may be secured if the nose is of a resilient rubber or similar material secured to the insert or core.

In Figs. 15 and 16 I show an insert 50 of a frangible current conductor material preferably high in carbon content and provided with sloping ends as previously disclosed. To one or both of the sloping ends I secured a nose 51 of resilient material, such as rubber or so called synthetics or substitutes. This insert may be applied to and replaced in a holder as previously described, and if applied by means of molten metal it is not affected by the heat thereof since the heat is rapidly absorbed by the holder.

The metal along the side faces secures member 8 in fixed relation to the holder 1 and in the case of a separately formed insert as in Figs. 8 to 14 inclusive it forms also a protection more from uneven side pressure when used in a separately formed holder and may increase the electrical contact between the members 8, 31 and 41 and the holder 1.

A metal nose may be secured to a carbon insert by plating the ends with a substantial copper coating and then applying the soft nose to the casting as by casting or by soldering or by a heating flame.

Having now described my invention, that which I claim as new and desire to secure by Letters Patent is:

1. A current collector of the shoe or sliding type comprising, in combination, an elongated holder of metal having spaced side walls and end walls, each wall having its ends integrally united to the adjacent end of the other wall and upstanding flanges projecting above the side walls, an elongated recess formed by the said walls, the end walls being lower than the side walls, an elongated insert of carbonaceous material secured in the recess and having its end and side faces spaced from the end and side walls respectively of the recess and its end faces projecting above the top face of the end walls, a filler of metal having a lower melting point than that of the holder secured in the space between the insert and holder and interlocked to the holder and insert to secure the parts together and form a normally unitary device, the said filler metal contacting the entire side and end faces of the insert and extending above the top face of the end walls and covering the end faces of the insert to protect the same from externally applied blows while in operation and means on the holder to secure it to a support, the construction of the holder and insert and the difference in melting points of the metals of the holder and filler being such that the filler metal and insert may be removed by heat applied to all parts without affecting the holder when the insert requires replacing.

2. A current collector of the shoe or sliding type comprising, in combination, an elongated holder of metal having integrally united spaced side and end walls forming an elongated open bottom and top recess therebetween and upstanding flanges projecting above the side walls, the end walls being lower than the side walls, an elongated insert secured in the recess and having its end and side faces spaced from the end and side walls respectively of the recess and its end faces projecting above the top face of the end walls, a filler of metal positioned in the space between the insert and holder and interlocked to the holder and insert to secure the parts together and form a normally unitary device, the said filler metal applied in a molten state and extending above the top face of the end walls and covering the end faces of the insert to protect the same from externally applied blows, the thickness of the filler metal at the insert ends increasing in thickness whereby the upper portion of the metal covering the ends of the insert will be thicker than the portion between the insert and end wall, and means on the holder to secure it to a support, the construction of the holder and insert and the melting point of the filler metal being such that the insert may be removed from the holder by heat without damage to the holder in order to replace a wornout insert.

3. A normally multi-part unitary current collector of the shoe or sliding type comprising, in combination, an elongated holder of metal having spaced side walls and end walls forming an elongated recess between the walls, the end walls being lower than the side walls, an elongated insert secured in the recess and having its end and side faces spaced from the end and side walls respectively of the recess and its side faces completely enclosed by the side walls of the holder and its end faces projecting above the top face of the end walls, a filler of metal positioned while in a molten state in the space between the insert and holder and secured to the holder and insert to secure the parts together when the filler metal has solidified and thereby forming a normally unitary shoe, the said filler metal extending above the top face of the end walls in increasing thickness and covering the end faces of the insert to protect the same from externally applied blows and means on the holder to secure it to a support, the insert and the filler metal being removable by heat without injury to the holder when the insert is removed.

4. A current collector comprising, in combination, a holder formed from a copper base metal with side walls and flanges and end walls and a recess between said side and end walls, an insert positioned in the recess, the end faces of the insert extending above the end walls and a filler of metal having a lower melting point than the holder cast about the sides and end walls of the insert within the recess thereby uniting the insert to the holder, and non-frangible resilient means extending over the end faces of the insert to protect the ends from injury while moving along an overhead trolley system, the insert being removable from the holder by reducing the filler metal to a molten condition.

5. In a normally unitary current collector of the shoe or sliding type including a unitary holder having an elongated recess with closed sides and ends and open top and bottom and an insert of frangible current conducting material having side faces spaced from the side faces of the recess and end faces extending above the end faces of the holder, the combination therewith of a filler of electric conducting material applied in a molten condition to the space between the insert and the holder to secure the insert in the holder and form a normally unitary three part shoe whereby the filler forms a conducting means contacting substantially the entire surface of the side faces of the insert and adjacent faces of the holder, and means applied to the end faces of the insert to protect the frangible insert from injury as it moves along the overhead trolley construction, the said means being a current conducting and non-frangible material softer than the insert and having a substantially upright front face to meet obstructions along the path of travel.

6. A current collector of the sliding type, comprising in combination, a metal holder having complete side and end walls integrally united to form a unitary member, an insert of frangible current conducting material positioned between said side and end walls and spaced therefrom, the said space filled with a current conducting non-frangible material forming a normally three-part unitary collector, whereby the insert may be removed for the purpose of replacement by subjecting the entire collector to sufficient heat to affect the filler and permit removal of the insert without affecting the holder, and non-frangible means secured to at least one end face of the insert to protect the insert from injury as it moves along a trolley conductor, the said means being thicker than the material between the insert and holder.

7. An insert for use in a holder for a current collector shoe to move along a trolley wire, comprising an elongated member of frangible current conducting material having substantially upright side faces and end faces sloping upwardly and inwardly and a longitudinal surface to engage a trolley wire and means increasing in thickness secured to at least one of the end faces, the said means formed of a non-frangible material and having its maximum thickness at the said longitudinal surface whereby the insert will be protected from injury due to contacting obstructions along the trolley wire.

8. An insert for use in a holder for a current collector shoe to move along a trolley wire, comprising an elongated member of frangible current conducting material having substantially upright side faces and end faces sloping upwardly and inwardly and a longitudinal surface to engage a trolley wire and a non-frangible nose secured to at least one of the end faces, the said nose formed of a resilient material and increasing in thickness with its maximum thickness at the said longitudinal surface whereby the insert will be protected from injury due to contacting obstructions along the trolley wire.

9. An insert for use with a holder forming part of a current collecting shoe, comprising an elongated body of non-metallic current conducting material having end faces sloping upwardly and inwardly and also having a grooved longitudinal surface extending between the end faces to conduct a trolley wire, a frame of non-frangible current conducting material secured to the side and end faces of the body and having substantially upstanding side and end faces in which the thickness of the frame at the end faces increases in thickness in accordance with the slope of the end faces of the body whereby the body is protected from injury as the insert moves along the trolley wire.

10. A current collector shoe to glide along an overhead trolley system comprising an elongated holder of metal having a relatively high melting point and having spaced upstanding side walls and flanges and end walls forming an elongated recess, a current conducting insert of frangible material positioned in the recess and having protecting means of a resilient material secured to at least one end face thereof to protect the insert from injury as it moves along a trolley wire, metallic means having a relatively low melting point applied while molten securing the insert in the recess and thereby forming a unitary device when the molten metal solidifies and whereby the said metallic securing means and the insert may be removed by heat without injury to the holder, the end walls of the holder being of less height than the side walls and the insert whereby the ends of the insert and the protecting means therefor extend above the end walls of the holder.

GEORGE A. MEAD.